(12) United States Patent
Yu et al.

(10) Patent No.: US 11,531,893 B2
(45) Date of Patent: Dec. 20, 2022

(54) METHOD AND APPARATUS WITH NEURAL NETWORK PARAMETER QUANTIZATION

(71) Applicants:Samsung Electronics Co., Ltd., Suwon-si (KR); UNIST(ULSAN NATIONAL INSTITUTE OF SCIENCE AND TECHNOLOGY), Ulsan (KR)

(72) Inventors: Hyeongseok Yu, Seoul (KR); Hyeonuk Sim, Iksan-si (KR); Jongeun Lee, Ulsan (KR)

(73) Assignees: Samsung Electronics Co., Ltd., Suwon-si (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 382 days.

(21) Appl. No.: 16/890,045

(22) Filed: Jun. 2, 2020

(65) Prior Publication Data
US 2020/0380360 A1 Dec. 3, 2020

Related U.S. Application Data

(60) Provisional application No. 62/856,212, filed on Jun. 3, 2019.

(30) Foreign Application Priority Data

Aug. 26, 2019 (KR) .......................... 10-2019-0104581

(51) Int. Cl.
G06N 3/08 (2006.01)
G06N 3/04 (2006.01)

(52) U.S. Cl.
CPC ................. *G06N 3/08* (2013.01); *G06N 3/04* (2013.01)

(58) Field of Classification Search
CPC .......... G06N 3/08; G06N 3/04; G06N 3/0445; G06N 3/0472; G06N 3/0481; G06N 3/0454; G06N 3/063
(Continued)

(56) References Cited

U.S. PATENT DOCUMENTS

| 10,264,265 | B1 | 4/2019 | Brailovskiy |
| 2017/0011288 | A1 | 1/2017 | Brothers et al. |
| 2019/0108436 | A1 | 4/2019 | David et al. |

FOREIGN PATENT DOCUMENTS

KR 10-2018-0125283 A 11/2018

OTHER PUBLICATIONS

Miyashita, Daisuke et al., "Convolutional Neural Networks using Logarithmic Data Representation," *arXiv preprint arXiv:1603.01025*, Mar. 17, 2016 (pp. 1-10).
(Continued)

*Primary Examiner* — Thierry L Pham
(74) *Attorney, Agent, or Firm* — NSIP Law

(57) ABSTRACT

A processor-implemented method includes determining a first quantization value by performing log quantization on a parameter from one of input activation values and weight values in a layer of a neural network, comparing a threshold value with an error between a first dequantization value obtained by dequantization of the first quantization value and the parameter, determining a second quantization value by performing log quantization on the error in response to the error being greater than the threshold value as a result of the comparing; and quantizing the parameter to a value in which the first quantization value and the second quantization value are grouped.

19 Claims, 13 Drawing Sheets

(58) Field of Classification Search
USPC .......................................................... 706/20
See application file for complete search history.

(56) References Cited

OTHER PUBLICATIONS

Lee, Edward H., et al. "Lognet: Energy-Efficient Neural Networks using Logarithmic Computation," *2017 IEEE International Conference on Acoustics, Speech and Signal Processing (ICASSP)*. IEEE, 2017 (pp. 5900-5904).

FIG. 6

| REAL VALUE OF PARAMETER (real value) | FIRST QUANTIZATION VALUE |
|---|---|
| 0.5 | 00001 |
| −0.25 | 11110 |
| 0.4375 | 00001 |

FIG. 7

| REAL VALUE OF PARAMETER (real value) | FIRST QUANTIZATION VALUE | FIRST DEQUANTIZATION VALUE | DIFFERENCE VALUE | | THRESHOLD VALUE |
|---|---|---|---|---|---|
| 0.5 | 00001 | 0.5 | 0 | < | 1/128 |
| −0.25 | 11110 | −0.25 | 0 | < | 1/128 |
| 0.4375 | 00001 | 0.5 | \|−0.0625\| | > | 1/128 |

FIG. 13

| | Precision | LinQ | LogQ | SLQ |
|---|---|---|---|---|
| AlexNet | 4b | 1.23 | 75.82 | 78.57 (4.08b)<br>79.32 (4.46b) |
| | 5b | 3.94 | 76.24 | 78.9 (5.10b) |
| | 6b | 74.15 | 76.3 | 79.41 (5.57b) |
| | float 32b | 80.7 | | |
| SqueezeNet | Precision | LinQ | LogQ | SLQ |
| | 4b | 0.58 | 77.94 | 78.98 (4.03b)<br>80.16 (4.22b) |
| | 5b | 58.08 | 78.14 | 80.82 (5.02b)<br>80.14 (5.28b) |
| | 6b | 80.44 | 78.14 | 80.90 (6.28b) |
| | float 32b | 81.06 | | |
| VGG-S | Precision | LinQ | LogQ | SLQ |
| | 5b | 0.46 | 81.45 | 83.19 (5.03b)<br>83.70 (5.22b) |
| | 6b | 51.53 | 81.72 | 83.72 (5.99b) |
| | 7b | 82.7 | 81.52 | 83.79 (7.19b) |
| | float 32b | 83.41 | | |

METHOD AND APPARATUS WITH NEURAL NETWORK PARAMETER QUANTIZATION

CROSS-REFERENCE TO RELATED APPLICATIONS

This application claims the benefit under 35 USC 119(e) of U.S. Provisional Application No. 62/856,212, filed on Jun. 3, 2019, and Korean Patent Application No. 10-2019-0104581, filed on Aug. 26, 2019, in the Korean Intellectual Property Office, the entire disclosures of which are incorporated herein by reference for all purposes.

BACKGROUND

1. Field

The following description relates to methods and apparatuses with neural network parameter quantization.

2. Description of Related Art

A neural network may be a computing system implemented with reference to a hardware computational architecture. Neural network technologies may analyze input data and extract valid information therefrom.

Neural network devices typically require large amounts of computation on complex input data. In order for neural network devices to analyze inputs in real time and extract information, a technology capable of efficiently processing neural network operations may be required. In particular, low-power and high-performance embedded systems, such as smartphones, may have limited resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes determining a first quantization value by performing log quantization on a parameter from one of input activation values and weight values in a layer of a neural network, comparing a threshold value with an error between a first dequantization value obtained by dequantization of the first quantization value and the parameter, determining a second quantization value by performing log quantization on the error in response to the error being greater than the threshold value as a result of the comparing, and quantizing the parameter to a value in which the first quantization value and the second quantization value are grouped.

The method may further include determining respective first quantization values by performing log quantization on respective parameters from both of the input activation values and the weight values.

The quantizing the parameter may include quantizing some of the respective parameters to only the corresponding first quantization values and quantizing some of the parameters to respective values based on the respective first quantization values and respective second quantization values, based on result of the determining for plural parameters.

The determining of the first quantization value may include determining the first quantization value by performing log quantization on a value corresponding to a quantization level closest to the parameter, from among a plurality of quantization levels, and the determining of the second quantization value may include determining the second quantization value by performing log quantization on a value corresponding to a quantization level closest to the error, from among the plurality of quantization levels.

The second quantization value may be represented by a same number of bits as a number of bits representing the first quantization value.

The threshold value may be determined based on a predetermined trade-off relationship between a recognition rate of the neural network and a size of data according to the quantization of the parameter.

The quantizing may include adding a tag bit to each of the first quantization value and the second quantization value.

The adding may include adding a first tag bit, indicating that there is the second quantization value subsequent to the first quantization value, before a first bit of bits representing the first quantization value or after a last bit of the bits, and adding a second tag bit, indicating that there is no quantization value subsequent to the second quantization value, before a first bit of bits representing the second quantization value or after a last bit of the bits.

The quantizing may include adding a code value, indicating that the first quantization value and the second quantization value are consecutive values, before a first bit of bits representing the first quantization value or after a last bit of bits representing the second quantization value.

The method may further include dequantizing the value in which the first quantization value and the second quantization value are grouped, and performing a convolution operation between a dequantization value obtained by dequantizing the value and the input activation values.

The dequantizing of the value may include calculating each of a first dequantization value, which is a value obtained by dequantization of the first quantization value, and a second dequantization value, which is a value obtained by dequantization of the second quantization value, and obtaining the dequantization value by adding the first dequantization value and the second dequantization value.

The determining of the first quantization value may include determining the first quantization value by performing log quantization on a value corresponding to a quantization level closest to the parameter, from among a plurality of quantization levels, and the determining of the second quantization value may include determining the second quantization value by performing log quantization on a value corresponding to a quantization level closest to the error, from among the plurality of quantization levels.

The second quantization value may be represented by a same number of bits as a number of bits representing the first quantization value.

The threshold value may be determined based on a predetermined trade-off relationship between a recognition rate of the neural network and a size of data according to the quantization of the parameter.

The quantizing may include adding a tag bit to each of the first quantization value and the second quantization value.

The adding may include adding a first tag bit, indicating that there is the second quantization value subsequent to the first quantization value, before a first bit of bits representing the first quantization value or after a last bit of the bits, and adding a second tag bit, indicating that there is no quantization value subsequent to the second quantization value, before a first bit of bits representing the second quantization value or after a last bit of the bits.

The quantizing may include adding a code value, indicating that the first quantization value and the second quantization value are consecutive values, before a first bit of bits representing the first quantization value or after a last bit of bits representing the second quantization value.

The method may further include dequantizing the value in which the first quantization value and the second quantization value are grouped, and performing a convolution operation between a dequantization value obtained by dequantizing the value and the input activation values.

The dequantizing of the value may include calculating each of a first dequantization value, which is a value obtained by dequantization of the first quantization value, and a second dequantization value, which is a value obtained by dequantization of the second quantization value, and obtaining the dequantization value by adding the first dequantization value and the second dequantization value.

The method may further include implementing the neural network using the quantized parameter.

In another general aspect, a non-transitory computer-readable storage medium stores instructions that, when executed by a processor, cause the processor to perform the method described above.

In another general aspect, an apparatus includes one or more processors configured to determine a first quantization value by performing log quantization on a parameter from one of input activation values and weight values in a layer of a neural network, compare a threshold value with an error between a first dequantization value obtained by dequantization of the first quantization value and the parameter, determine a second quantization value by performing log quantization on the error in response to the error being greater than the threshold value as a result of the comparing, and quantize the parameter to a value in which the first quantization value and the second quantization value are grouped.

The one or more processors may be further configured to determine respective first quantization values by performing log quantization on respective parameters from both of the input activation values and the weight values.

The quantizing the parameter may include quantizing some of the respective parameters to only the corresponding first quantization values and quantizing some of the parameters to respective first quantization values and respective second quantization values, based on result of the determining for plural parameters.

The apparatus may further include a memory storing instructions, which, when executed by the one or more processors, configure the one or more processors to perform the determination of the first quantization value, the comparison, the determination of the second quantization value, and the quantization.

The one or more processors may be further configured to determine the first quantization value by performing log quantization on a value corresponding to a quantization level closest to the parameter, from among a plurality of quantization levels, and determine the second quantization value by performing log quantization on a value corresponding to a quantization level closest to the error, from among the plurality of quantization levels.

The second quantization value may be represented by a same number of bits as a number of bits representing the first quantization value.

The threshold value may be determined based on a predetermined trade-off relationship between a recognition rate of the neural network and a size of data according to the quantization of the parameter.

The one or more processors may be further configured to add a tag bit to each of the first quantization value and the second quantization value.

The one or more processors may be further configured to add a first tag bit, indicating that there is the second quantization value subsequent to the first quantization value, before a first bit of bits representing the first quantization value or after a last bit of the bits, and add a second tag bit, indicating that there is no quantization value subsequent to the second quantization value, before a first bit of bits representing the second quantization value or after a last bit of the bits.

The one or more processors may be further configured to add a code value, indicating that the first quantization value and the second quantization value are consecutive values, before a first bit of bits representing the first quantization value or after a last bit of bits representing the second quantization value.

The one or more processors may be further configured to dequantize the value in which the first quantization value and the second quantization value are grouped, and perform a convolution operation between a dequantization value obtained by dequantizing the value and the input activation values.

The one or more processors may be further configured to calculate each of a first dequantization value, which is a value obtained by dequantization of the first quantization value, and a second dequantization value, which is a value obtained by dequantization of the second quantization value, and obtain the dequantization value by adding the first dequantization value and the second dequantization value.

The one or more processors may be further configured to implement the neural network using the quantized parameter.

In another general aspect, an apparatus includes a memory and one or more processors configured to determine respective first quantization values by performing respective log quantization on one or more parameters including either one or both of input activation values and weight values processed in a layer of a neural network, compare a threshold value with respective errors between a corresponding first dequantization value obtained by dequantization of the respective first quantization values and the one or more parameters, determine second quantization values by performing log quantization on the respective errors in response to the one or more of the respective errors being greater than the threshold value as a result of the comparing, and quantize the one or more parameters to values in which the respective first quantization value and the respective second quantization value are grouped.

Other features and aspects will be apparent from the following detailed description, the drawings, and the claims.

BRIEF DESCRIPTION OF THE DRAWINGS

FIG. 6 illustrates a neural network device that determines a first quantization value, according to one or more embodiments.

FIG. 7 illustrates a neural network device that determines whether a difference between a first dequantization value and a parameter is greater than a threshold value, according to one or more embodiments.

FIG. 13 is a view for comparing accuracies according to methods of quantizing a parameter in a neural network, according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
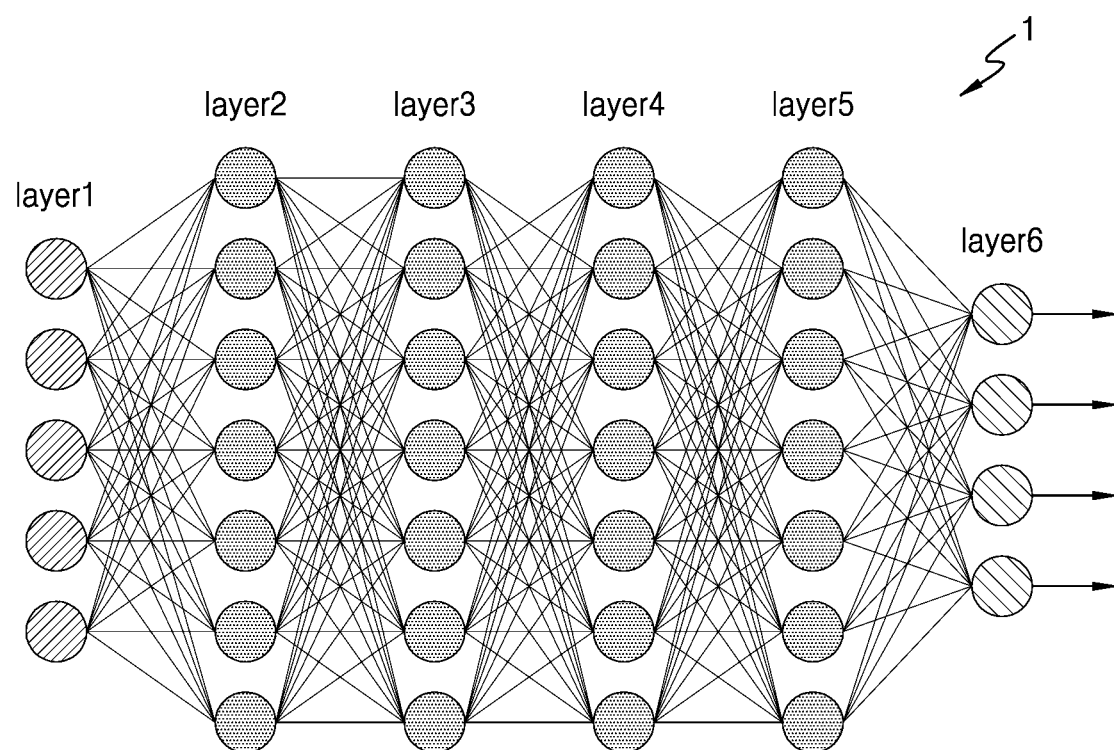
FIG. 1 is a view illustrating an architecture of a neural network, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Terms such as "including" or "comprising" used in the embodiments should not be construed as necessarily including all of various components, or various operations described in the specification, and it should be construed that some of the components or some of the operations may not be included or may further include additional components or operations. The use of the term "may" herein with respect to an example or embodiment (e.g., as to what an example or embodiment may include or implement) means that at least one example or embodiment exists where such a feature is included or implemented, while all examples are not limited thereto.

In the specification, expressions or terms such as "include," "comprise," "including," and "comprising" should not be construed as always including all specified elements, processes, or operations, but may be construed as not including some of the specified elements, processes, or operations, or further including other elements, processes, or operations.

Hereinafter, example embodiments will be described in detail with reference to the accompanying drawings. However, embodiments may be implemented in various forms and should not be construed as being limited to the embodiments set forth herein.

FIG. 1 is a view illustrating an architecture of a neural network, according to one or more embodiments.

Referring to FIG. 1, the neural network 1 may have an architecture of a deep neural network (DNN) or an n-layer neural network. The DNN or the n-layer neural network may correspond to a convolutional neural network (CNN), a recurrent neural network (RNN), a deep belief network, a restricted Boltzmann machine, and so on, as non-limiting examples. For example, the neural network 1 may be implemented as a CNN, but the type of the neural network 1 is not limited to being a CNN.

The neural network 1 may be a DNN including an input layer Layer1, four hidden layers Layer2, Layer3, Layer4, and Layer5, and an output layer Layer6. For example, when the neural network 1 represents a CNN, the input layer Layer1, the hidden layers Layer2 to Layer5, and the output layer Layer6 may correspond to layers of a portion of the CNN, which as a non-limiting example may correspond to a convolution layer, a pooling layer, a fully connected layer, and so on.

Each of the layers included in the neural network 1 may include a plurality of artificial nodes, also known as artificial neurons, processing elements (PEs), units, or similar terms. For example, as shown in FIG. 1, the input layer Layer1 may include five nodes and the hidden layer Layer2 may include seven nodes. However, this is only an example, and each of the layers included in the neural network 1 may include various numbers of nodes.

Nodes included in each of the layers included in the neural network 1 may be connected to each other to exchange data. For example, one node may receive data from other nodes, may perform a computation using the data, and may output a computation result to other nodes.

When the neural network 1 is implemented using a DNN architecture, the neural network 1 may include a plurality of layers capable of processing valid information. Accordingly, the neural network 1 may process data sets of higher complexity than a neural network having only a single layer. Although FIG. 1 illustrates that the neural network 1 may include six layers, this is only an example. For example, the neural network 1 may include fewer or more layers than the six layers illustrated in FIG. 1. That is, the neural network 1 may include various structures of layers differing from the layers shown in FIG. 1. For example, the neural network 1 may include differing numbers of layers, where each layer may have differing numbers of nodes.

Figure 2:
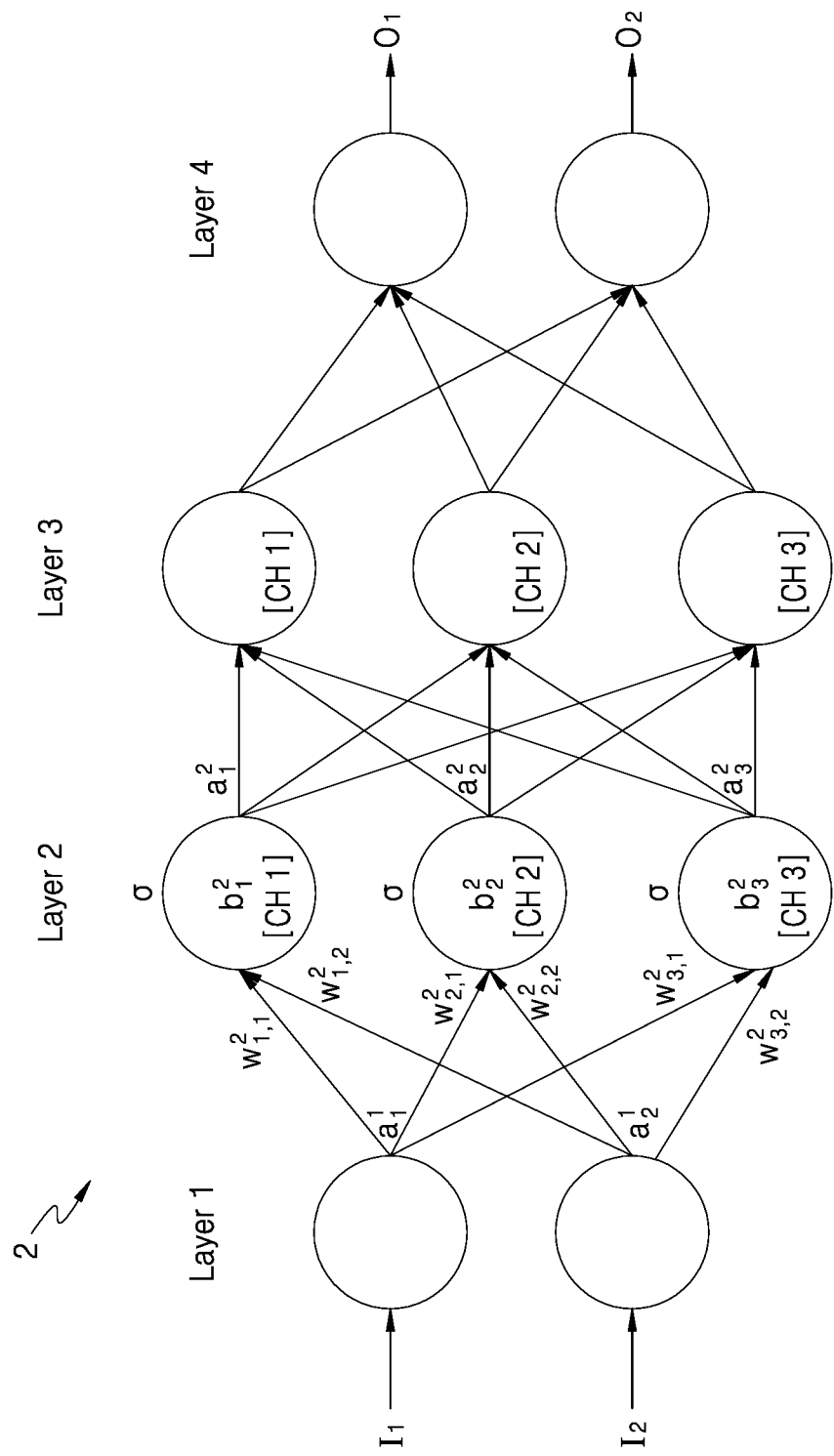
FIG. 2 is a view illustrating an operation performed in a neural network, according to one or more embodiments.

FIG. 2 is a view illustrating an operation performed in a neural network 2, according to one or more embodiments.

Referring to FIG. 2, the neural network 2 may have a structure including an input layer, one or more hidden layers, and an output layer. The neural network 2 may perform an operation based on received input data, for example, $I_1$ and $I_2$, and may generate output data, for example, $O_1$ and $O_2$, based on a result of performing the operation.

In one or more embodiments, the neural network 2 may be a DNN or an n-layer neural network including two or more hidden layers, as described above. For example, as shown in FIG. 2, the neural network 2 may be a DNN including an input layer (Layer1), two hidden layers (Layer2 and Layer3), and an output layer (Layer4). When the neural network 2 is implemented with the DNN architecture, the neural network 2 may include more layers capable of processing information when implemented as a DNN architecture. Moreover, the neural network 2 is shown in FIG. 2 as including four layers, but FIG. 2 is only a non-limiting example, and the neural network 2 is also representative of a neural network with fewer or more layers than 4, and may include fewer or more channels (e.g., the aforementioned nodes) than the channels (nodes) shown in FIG. 2, each channel having one or more artificial nodes. Therefore, the neural network 2 may include layers of various sorts.

Each of the layers included in the neural network 2 may include a plurality of channels (e.g., each illustrated channel being representative of one or more nodes). As illustrated in FIG. 2, for example, the input layer Layer 1 may include two channels (nodes), and the hidden layers Layer 2 and Layer 3, each of which may include three channels (nodes). However, this is only a non-limiting example, and each of the layers included in the neural network 2 may include various numbers of channels (and respective one or more nodes), in one or more embodiments.

The channels (nodes) included in each of the layers of the neural network 2 may be connected to other channels (nodes), all of which are able to process data. For example, any one channel (node) may receive data from other channels or nodes, such as channels (nodes) in a previous layer, to calculate the data, and output a result of such computations to channels (nodes) of another layer or the same layer at a different time.

An input and an output of each of the channels (nodes) may be respectively referred to as input activation and output activation, respectively, for a given channel (node). That is, the activation may be an output of one channel (node) and then also be a parameter for an input activation of one or more channels (nodes) included in the next layer. Moreover, each of the channels (nodes) may determine and output its own activation, based on input activations received from the channels (nodes) included in a previous layer and based on respective connection weights and a bias. Each weight is a parameter used to calculate an output activation in each channel (node), and is a value assigned to a connection relationship between the channels (or respective nodes).

Operations of each of the channels (or of each node or plural nodes represented by each illustrated channel of a layer) may be implemented by a computational unit or a processing element that receives an input and outputs output activation. Such a computational unit or a processing element may be implemented in a variety of ways by one or more hardware processors, one or more hardware computers, or through a combination of hardware and instructions executed by the hardware. The input-output relationship of each of the channels (nodes) can, thus, be mapped appropriately by such processors. For example, when σ denotes an activation function, $w_{jk}^i$ denotes a weight from a k-th channel (or node) included in an (i−1)-th layer to a j-th channel (or node) included in an i-th layer, $b_j^i$ is a bias of the j-th channel (or node) included in the i-th layer, and $a_j^i$ is the activation of the j-th channel (or node) included in the i-th layer, the activation $a_j^i$ may be calculated using the example Equation 1, below.

$$a_j^i = \sigma\left(\sum_k (w_{jk}^i \times a_k^{i-1}) + b_j^i\right) \quad \text{Equation 1}$$

As illustrated in the one or more embodiments of FIG. 2, an activation of a first channel CH 1 (or node) of a second layer (i.e., the hidden layer Layer2) may be represented by $a_1^2$. Also, $a_1^2$ may have a value of $a_1^2 = \sigma(w_{1,1}^2 \times a_1^1 + w_{1,2}^2 \times a_2^1 + b_1^2)$, according to Equation 1. However, Equation 1 is only a non-limiting example for calculating the activations, and applications of the weights and biases used for processing data in the neural network 2, but activation operations are not limited to Equation 1. The activation may refer to a value, obtained by passing a sum of respectively weighted input activations from a previous layer to an activation function, such as a sigmoid function or a rectified linear unit (ReLU) function.

In general, parameters of floating point format and fixed point format may be used as inputs of layers. In addition, parameters of floating point format and fixed point format may be used as weight and bias values.

As described above, in the neural network 2, a large number of data sets are exchanged between a plurality of interconnected channels (or nodes) and under a number of operations incrementally through multiple layers. Accordingly, the neural network may advantageously implement a technique capable of reducing the loss of accuracy while reducing the amount of computation required for processing complex input data.

Figure 3:
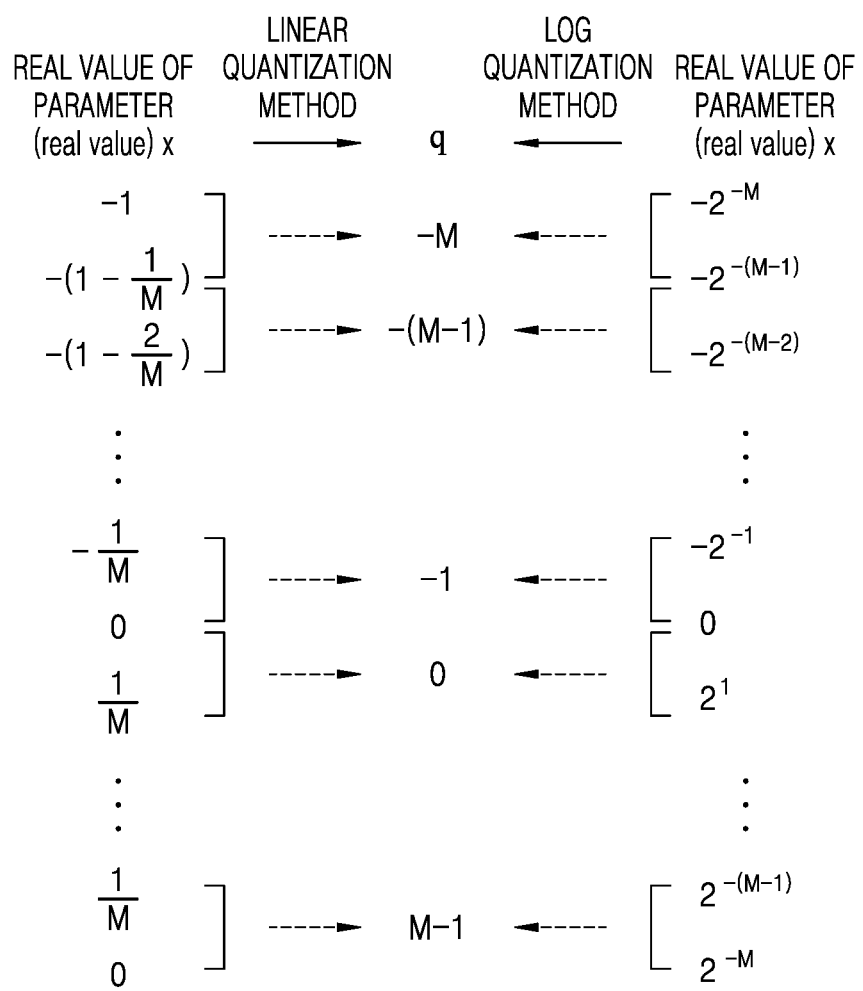
FIG. 3 is a view illustrating a linear quantization method and a log quantization method, according to one or more embodiments.

FIG. 3 is a view illustrating a linear quantization method and a log quantization method, according to one or more embodiments.

In order to reduce the amount of computation generated in a neural network, for example, the neural network 1 of FIG. 1, or neural network 2 of FIG. 2, as non-limiting examples, various methods of quantizing parameters included in the neural network exist according to one or more embodiments. For example, by quantizing weight parameters into bits of a bit length less than an original bit length, it may be possible to reduce the amount of computation required to process the weight parameters although the accuracy may also be somewhat reduced. Such quantization methods may include, as non-limiting examples, a linear quantization method and a log quantization method.

The linear quantization method may be a quantization method that allocates quantization levels at regular intervals to parameters of a neural network targeted for quantization. By contrast, the log quantization method may allocate quantization levels based on a logarithmic (log) data representation. Such a logarithmic data representation allocates relatively few quantization levels to parameters near large values and allocates relatively many quantization levels to parameters near zero.

For example, referring to FIG. 3, a real value x of a parameter present in the interval of −1 to 1 may be quantized to correspond to a quantized integer value q. In this example, q may be an integer value between −M and M−1, and M may be, for example, 2N−1, and may thus be an odd integer value rather than an even integer value.

According to the linear quantization method, x values in the interval of −1 to −(1−1/M) may be quantized to an integer value−M, and x values in the interval of −(1−1/M) to −(1−2/M) may be quantized to an integer value−(M−1). Similarly, x in the interval of 1−1/M to 1 may be quantized to an integer value M−1.

According to the log quantization method, x values in the interval of −2−M to −2−(M−1) may be quantized to an integer value−M, and x values in the interval of −2−(M−1) to −2−(M−2) may be quantized to an integer value−(M−1). Likewise, x values in the interval of 2−(M−1) to 2−M may be quantized to an integer value M−1.

Figure 4:
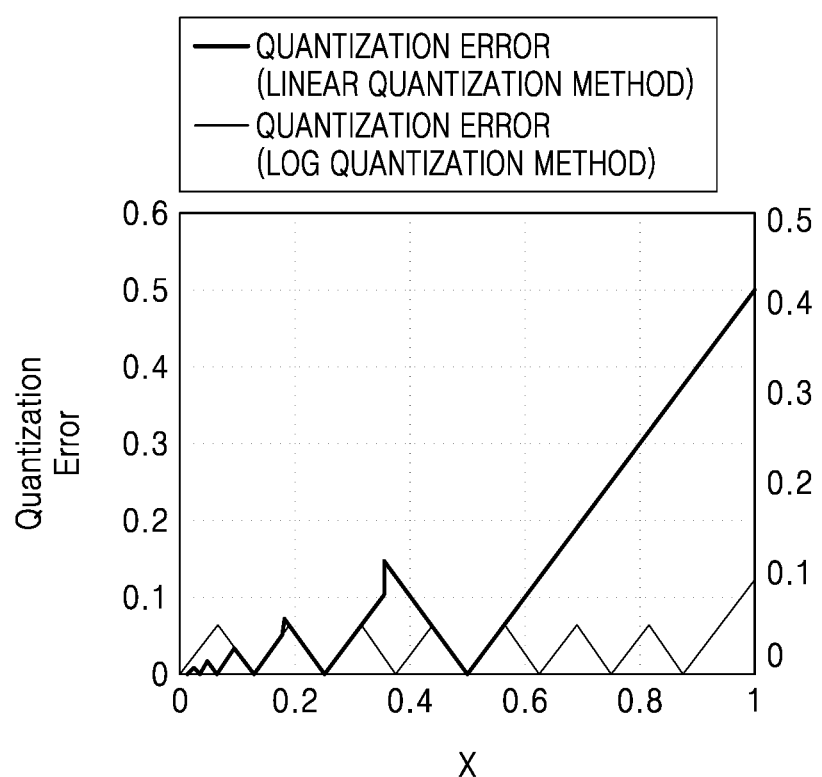
FIG. 4 is a view illustrating a quantization error for each of a linear quantization method and a log quantization method, according to one or more embodiments.

FIG. 4 is a view illustrating a quantization error for each of a linear quantization method and a log quantization method, according to one or more embodiments.

The quantization error may represent the difference or delta (δ) between the real value x of the parameter and the quantized integer value q. FIG. 4 is a graph illustrating a quantization error value according to the real value x of the parameter.

When the real value x of the parameter is a value close to zero, a quantization error value by the log quantization method may be less than or equal to a quantization error value resulting from the linear quantization method. However, as the real value x of the parameter approaches 1, the quantization error value by the log quantization method may be greater than the quantization error value resulting from the linear quantization method. As the quantization error value increases, a recognition rate of the neural network, for example, the neural network 1 of FIG. 1, or neural network 2 of FIG. 2, as non-limiting examples, may decrease. Accordingly, a quantization method may required to resolve a phenomenon in which the quantization error value increases as the real value x of the parameter approaches 1.

In typical log quantization approaches, a parameter may be represented by one quantization value, whereas in one or more embodiments a log quantization method in which a parameter may be represented by two or more quantization values may be implemented, when the quantization error value is greater than or equal to a threshold value. In addition, embodiments may generate a neural network having processing capabilities, such as quantizing and storing parameters in a neural network by using one or more proposed quantization methods and accordingly dequantizing the quantized parameters to perform an operation.

Figure 5:
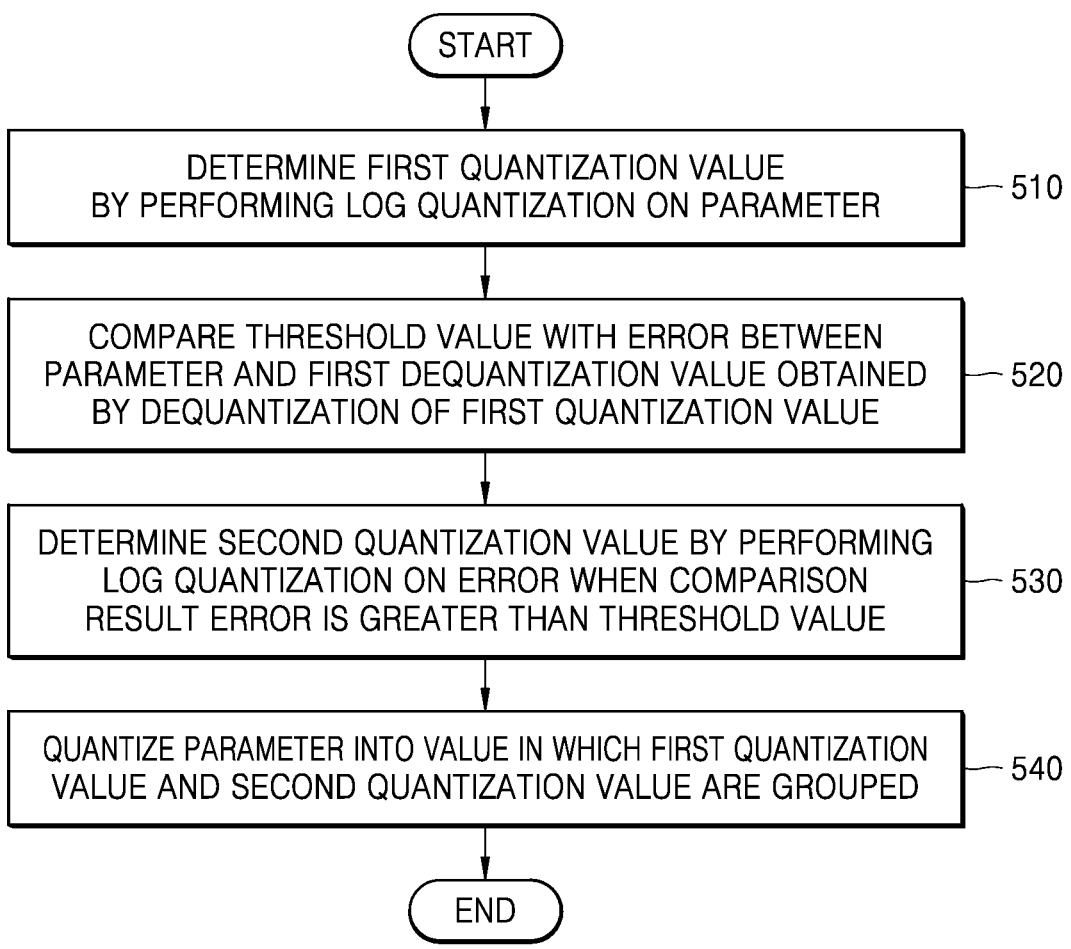
FIG. 5 is a flowchart illustrating a method of quantizing a parameter in a neural network, according to one or more embodiments.

FIG. 5 is a flowchart illustrating a method of quantizing a parameter in a neural network, according to one or more embodiments.

Figure 16:
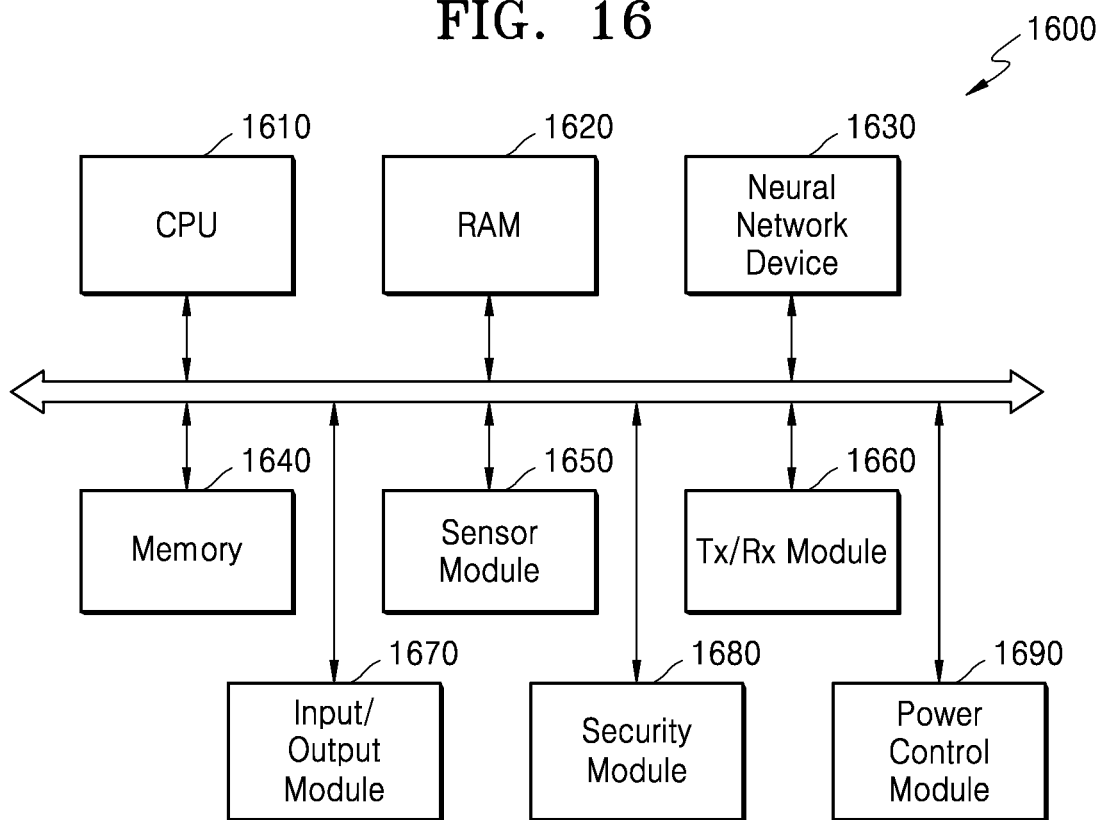
FIG. 16 is a block diagram of an electronic system according to one or more embodiments.
Figure 17:
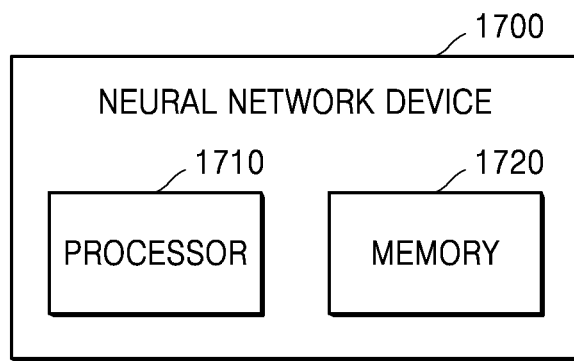
FIG. 17 is a block diagram illustrating a configuration of a neural network apparatus, according to one or more embodiments.

Referring to FIG. 5, the method of quantizing a parameter in a neural network includes operations processed in time series in a neural network device, such as neural network device 1700 as shown in FIG. 17. Accordingly, even if omitted directly below for brevity, the description of the neural network device 1700 shown in FIG. 17, or the neural network device or the neural network device or electronic device of FIG. 16, which are provided in greater detail, below, may be description that applies to the method of FIG. 5.

In operation 510, the neural network device may determine a first quantization value by performing log quantization on a parameter.

The parameter may include, but is not limited to, at least one of activation values processed in a layer of a neural network and weight values processed in the layer, as non-limiting examples.

FIG. 6 illustrates a neural network device that determines a first quantization value, according to one or more embodiments.

Referring to FIG. 6, the neural network device may determine the first quantization value based on a log quantization having a base value of 2, as a non-limiting example, but is not limited thereto. For example, the base may correspond to various values other than 2, such as other integral values for the base, which may be integers that are various powers of 2, such as 4, 8, 16, and so on. The neural network device may determine the first quantization value by performing log quantization on a value corresponding to a quantization level closest to a parameter, from among a plurality of quantization levels.

For example, when the real value of the parameter is 0.5, or $2^{-1}$, the neural network device may express 1 corresponding to the absolute value of −1 corresponding to the exponent of 2 in binary and determine it as the first quantization value. The neural network device may represent the first quantization value as 5 bits, and the first quantization value may thus be 00001. However, embodiments are not limited thereto, and the first quantization value may be represented by various numbers of bits other than 5 bits.

Alternatively, when the real value of the parameter is −0.25, or $-(2^{-2})$, the neural network device may express 2 corresponding to the absolute value of −2 corresponding to the exponent of 2 in binary and may determine the absolute value as the first quantization value. In this example, because the real value of the parameter is negative, the neural network device may determine the first quantization value as 11110 by using a two's complement method to represent the parameter. However, this is only a non-limiting example, and other examples used to represent negative numbers may be used, in other examples.

Alternatively, when the real value of the parameter is 0.4375, the neural network device may determine 00001, corresponding to 0.5, or $2^{-1}$, as being close to 0.4375 as the first quantization value. However, embodiments are not limited thereto, and the first quantization value may be variously determined according to an interval between quantization levels allocated to a parameter of a neural network. For example, the quantization level corresponding to 0.5, or $2^{-1}$, may not be included in a plurality of quantization levels allocated to the parameter of the neural network. In this example, 00010 may instead be determined as the first quantization value by performing log quantization on 0.25, or $2^{-2}$, which is a value corresponding to a quantization level closest to 0.4375 from among the plurality of allocated quantization levels.

Referring back to FIG. 5, in operation 520, the neural network device may compare a threshold value with an error between the parameter and a first dequantization value obtained by dequantization of the first quantization value.

For example, the neural network device may obtain the first dequantization value by dequantization (i.e., inverse quantization) of the first quantization value by the example Equation 2, below.

$$\tilde{x} = \begin{cases} \text{sign}(q)2^{-|q|} \\ 0 \end{cases} \qquad \text{Equation 2}$$

In Equation 2, q may correspond to a first quantization value, and $\tilde{x}$ may correspond to a first dequantization value obtained by dequantization of the first quantization value.

When the error between the first dequantization value and the parameter is less than the threshold value, the parameter may be quantized to the first quantization value. However, when the error is greater than the threshold value, the recognition rate of the neural network may be degraded as a result of the quantization. Therefore, the parameter may be represented by two or more quantization values including the first quantization value, which may help the neural network avoid degradation.

FIG. 7 illustrates a neural network device that determines whether a difference between a first dequantization value and a parameter is greater than a threshold value, according to one or more embodiments.

As described above with reference to FIG. 6, when the real value of the parameter is 0.5, or $2^{-1}$, the first quantization value may be 00001. Based on Equation 1, a first dequantization value of 0.5 may be obtained by dequantization of the first quantization value 00001. The difference between the real value 0.5 of the parameter and the first dequantization value 0.5 is 0. Accordingly, because the difference between the real value of the parameter and the first dequantization value is less than the threshold value of $\frac{1}{128}$, the parameter may be finally quantized to 00001.

Similarly, even when the real value of the parameter is −0.25, or −($2^{-2}$), because the difference between the real value of the parameter and the first dequantization value obtained by dequantization of 11110 is 0, the parameter may be finally quantized to 11110.

However, when the real value of the parameter is 0.4375, the first quantization value is 00001. Because the first dequantization value obtained by dequantization of 00001 is 0.5, the difference between 0.4375, which is a real value of the parameter, and 0.5, which is the first dequantization value, is |−0.0625|. Accordingly, one parameter may be represented by two or more quantization values, e.g., including the first quantization value 00001, which is described later in greater detail with reference to FIG. 8.

Although the threshold value is set to be $\frac{1}{128}$ in FIG. 7, as a non-limiting example, the threshold value is not limited to this enumerated example and may correspond to various values in various embodiments. For example, the threshold value may be determined based on the recognition rate of the neural network and the size of data according to quantization of the parameter. Because the threshold value is smaller, the real value of the parameter may be quantized with higher accuracy. Thus, the recognition rate of the neural network may increase accordingly. However, the size of the data may increase by representing the parameter by using a plurality of quantization values. Accordingly, the threshold value may be determined based on a consideration of a trade-off relationship between the recognition rate of the neural network and the size of data corresponding to a quantization value.

Referring back to FIG. 5, in operation 530, when a comparison result error is greater than the threshold value, the neural network device, such as neural network device 1700 as a non-limiting example, may determine a second quantization value by performing log quantization on the error.

Figure 8:
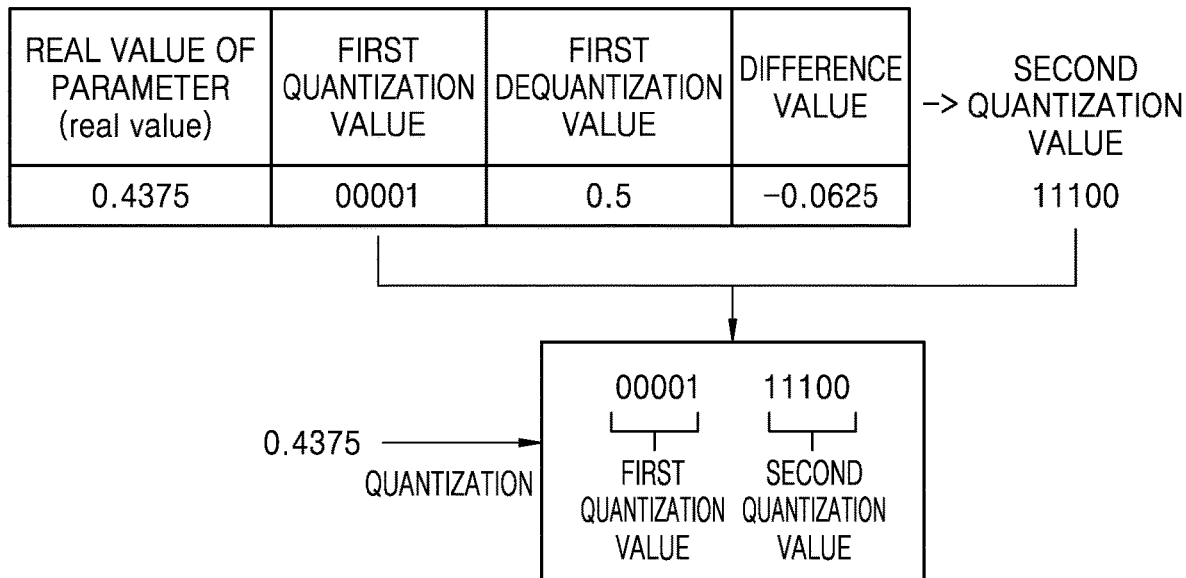
FIG. 8 is a view illustrating a neural network device that determines a second quantization value, according to one or more embodiments.

FIG. 8 is a view illustrating a neural network device that determines a second quantization value, according to one or more embodiments.

As in determining the first quantization value, the neural network device may determine the second quantization value by performing log quantization on a value corresponding to a quantization level closest to the error from among a plurality of quantization levels. In this example, the second quantization value may be represented by the same number of bits as the number of bits representing the first quantization value. For example, when the first quantization value is represented by 5 bits, the neural network device may also express the second quantization value by 5 bits, as a non-limiting example. However, embodiments are not limited thereto, and the first quantization value and the second quantization value may be represented by different numbers of bits other than 5 bits.

As described above with reference to FIG. 7, an error between 0.4375, which is a real value of the parameter, and 0.5, which is a first dequantization value obtained by dequantization of the first quantization value 00001, is −0.0625. The neural network device may perform log quantization on −0.0625−($2^{-4}$) corresponding to the error. In this example, because the error is negative, the neural network device may determine the second quantization value as 11110 by using the two's complement method, as a non-limiting example.

Referring back to FIG. 5, in operation 540, the neural network device may quantize the parameter into a value in which the first quantization value and the second quantization value are grouped.

For example, the value in which the first and second quantization values are grouped may correspond to a value in which the second quantization value is consecutively located after the first quantization value, in order to form one group. Referring to FIG. 8, when the real value of the parameter is 0.4375, the neural network device may quantize the parameter into a value in which 00001, corresponding to the first quantization value, and 11110, corresponding to the second quantization value, are grouped.

An encoding process may also be performed to indicate that the first quantization value and the second quantization value are values obtained by quantizing one parameter, which is described later in greater detail with reference to FIGS. 9 and 10.

Figure 9:
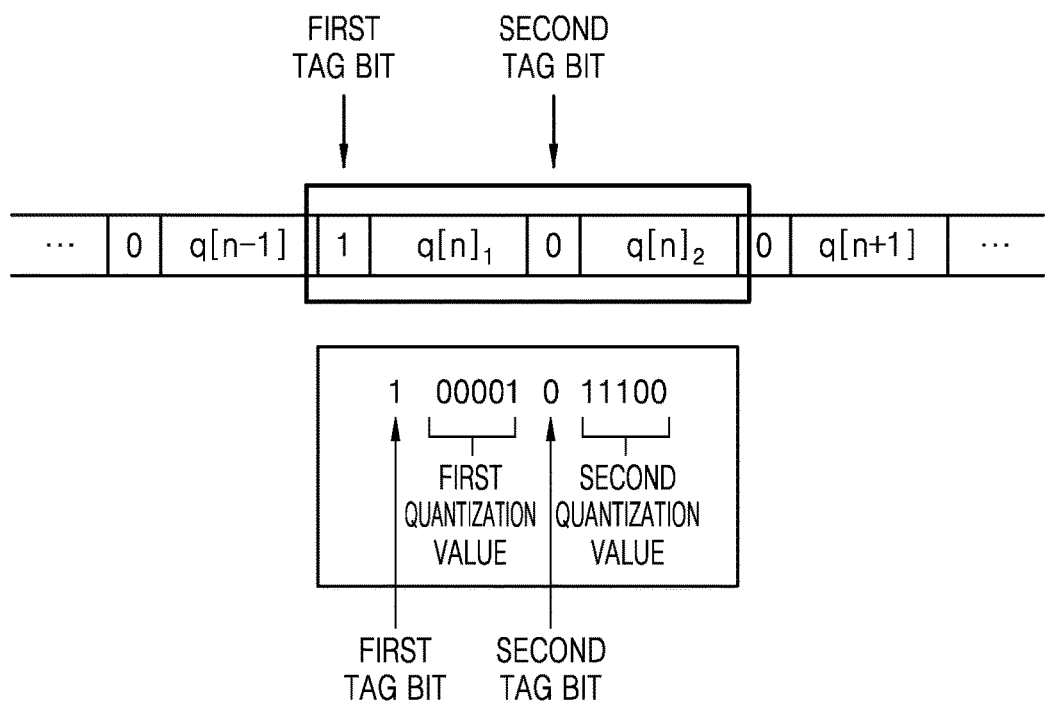
FIG. 9 is a view illustrating how a first quantization value and a second quantization value are values obtained by quantizing one parameter by using a tag bit, according to one or more embodiments.

FIG. 9 is a view illustrating that a first quantization value and a second quantization value are values obtained by quantizing one parameter by using a tag bit, according to one or more embodiments.

The neural network device, such as neural network device 1700 as a non-limiting example, may add a tag bit to each of the first and second quantization values to indicate that the first and second quantization values are values obtained by quantizing one parameter.

For example, the neural network device may add a first tag bit, which may indicate that there is a second quantization value subsequent to a first quantization value, before a first bit of bits representing the first quantization value or after a last bit of the bits. Also, the neural network device may add a second tag bit, which may indicate that there is no quantization value subsequent to the second quantization value, before a first bit of bits representing the second quantization value or after a last bit of the bits. When the first tag bit is 1, the second tag bit may be 0, as a non-limiting example, but the second tag bit is not limited thereto. When the first tag bit is 0, the second tag bit may be 1. Thus, in non-limiting examples, the first and second tag bits may have opposite values.

Referring to FIG. 9, according to a non-limiting example, one of the first tag bit and the second tag bit may be added before a first bit of bits representing each of quantization values. In such an example, the first tag bit may correspond to 1 and the second tag bit may correspond to 0. Because 0, corresponding to the second tag bit, is added before a first bit of bits representing each of quantization values q[n−1], q[n]$_2$, and q[n+1], it may be observed that there are no consecutive quantization values in each of the quantization values q[n−1], q[n]$_2$, and q[n+1]. Because 1, corresponding to the first tag bit, is added before a first bit of bits representing q[n]$_1$, it may be observed that q[n]$_1$ has consecutive quantization values. Accordingly, q[n]$_1$ and q[n]$_2$ may correspond to grouped values that are located consecutively, and the grouped values may indicate values obtained by quantizing a single parameter.

For example, when the first quantization value is 00001 and the second quantization value is 11100, a value of 1, corresponding to the first tag bit, may be added before a first bit of bits representing 00001, and a value of 0, corresponding to the second tag bit, may be added before a first bit of bits representing 11100. Through using this approach, the first quantization value 00001 and the second quantization value 11100 may be grouped, thereby indicating that the grouped values may be values obtained by quantizing a single parameter.

Figure 10:
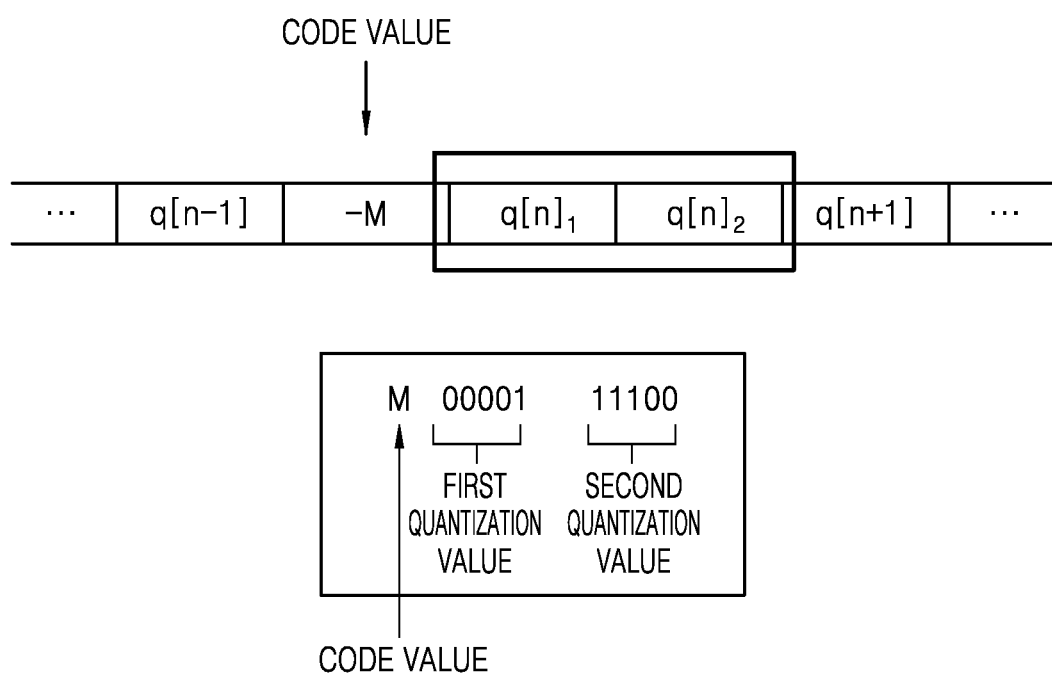
FIG. 10 is a view illustrating how a first quantized value and a second quantized value are values obtained by quantizing one parameter by using a code value, according to one or more embodiments.

FIG. 10 is a view illustrating that a first quantized value and a second quantized value are values obtained by quantizing one parameter by using a code value, according to one or more embodiments.

The neural network device, such as neural network device 1700 as a non-limiting example, may add a specific code value to indicate that the first quantization value and the second quantization value are values obtained by quantizing one parameter. The code value may include the same number of bits as the first quantization value or the second quantization value, as a non-limiting example, but the code value is not limited to such a number of bits, and other numbers of bits may be used in other examples.

For example, the neural network device may add a code value, where the code value may indicate that the first quantization value and the second quantization value are consecutive values, before a first bit of bits representing the first quantization value or after a last bit of bits representing the second quantization value, as a non-limiting example.

Referring to FIG. 10, the code value may be added before a first bit of bits representing a quantization value, according to a non-limiting example. Because no code value is added before a first bit of bits representing each of the quantization values q[n−1], q[n]$_2$, and q[n+1], it may be observed that there are no consecutive quantization values in each of the quantization values q[n−1], q[n]$_2$, and q[n+1]. On the other hand, because a code value is added before a first bit of bits representing the quantization value q[n]$_1$, it may be observed that q[n]$_1$ has consecutive quantization values. Accordingly, q[n]$_1$ and q[n]$_2$ may correspond to grouped values that are located consecutively, and the grouped values may indicate values obtained by quantizing one parameter.

As an example, when the first quantization value is 00001 and the second quantization value is 11100, a code value−M may be added before a first bit of bits representing 00001. Through such a technique, the first quantization value 00001 and the second quantization value 11100 may be grouped, thereby indicating that the grouped values may be values obtained by quantizing one parameter.

Figure 11:
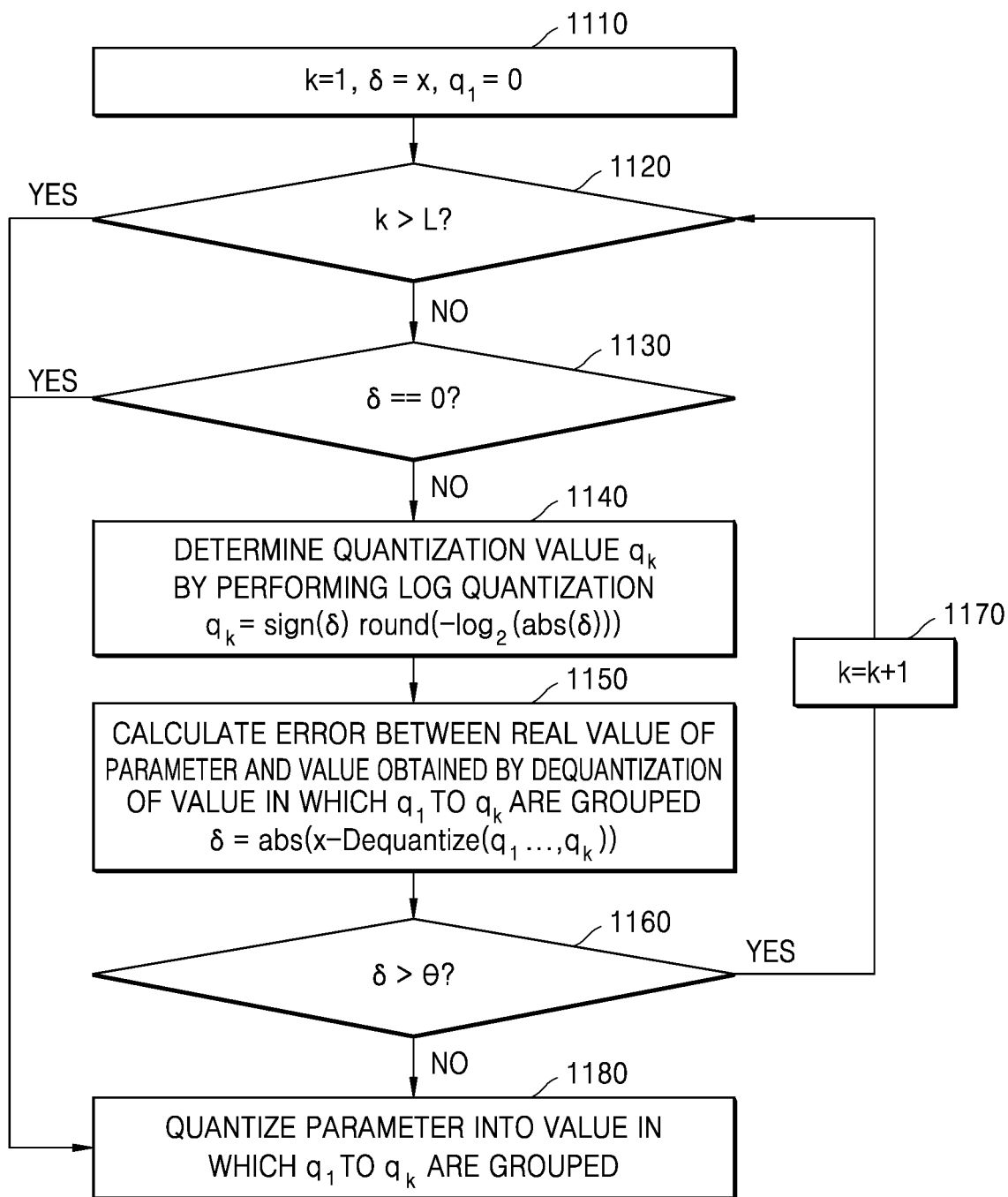
FIG. 11 is a flowchart illustrating a method in which a neural network device quantizes a parameter, according to one or more embodiments.

FIG. 11 is a flowchart illustrating a method in which a neural network device quantizes a parameter, according to one or more embodiments.

In operation 1110, the neural network device, such as neural network device 1700 as a non-limiting example, may set k=1, δ=x, and q1=0 as being initial conditions. x may correspond to a real value of a parameter to be quantized by the neural network apparatus.

In operation 1120, the neural network device may determine whether a value corresponding to k is greater than L. For example, L may correspond to the maximum number of quantization values that may be grouped, when the parameter is quantized to a value, in which a plurality of quantization values is grouped. If it is determined that the value corresponding to k is not greater than L, operation 1130 may be performed. If it is determined that the value corresponding to k is greater than L, operation 1180 may be performed.

In operation 1130, the neural network device may determine whether a difference value corresponding to δ is 0. If it is determined that the value corresponding to δ is 0, operation 1140 may be performed. If it is determined that the value corresponding to δ is not 0, operation 1180 may be performed.

In operation 1140, the neural network device may determine a quantization value q$_k$ by performing log quantization. q$_k$ may be determined using the example Equation 3, below.

$$qk = \text{sign}(\delta)\text{round}(-\log 2(\text{abs}(\delta))) \quad \text{Equation 3:}$$

In Equation 3, sign(δ) may be determined to be 1 or −1 according to the sign of δ, abs(δ) may correspond to the absolute value of δ, and round(−log 2(abs(δ))) may correspond to a value obtained by rounding a value corresponding to −log 2(abs(δ)) to one decimal place.

In operation 1150, the neural network device may calculate an error between the real value of the parameter and a value obtained by dequantization of a value in which quantization values q$_1$ to q$_k$ are grouped. The error may be determined using the example Equation 4, below.

$$\delta = \text{abs}(x - \text{dequantize}(q_1 \ldots q_k)) \quad \text{Equation 4:}$$

In Equation 4, dequantize(q$_1$ ... q$_k$) may correspond to a value obtained by dequantization of a value in which the quantization values q$_1$ to q$_k$ are grouped, and abs(x−dequantize($q_1 \ldots q_k$)) may correspond to the absolute value of x–dequantize($q_1 \ldots q_k$). Dequantization of a value in which the quantization values $q_1$ to $q_k$ are grouped is described in greater detail later with reference to FIG. 12.

In operation 1160, the neural network device may determine whether a value corresponding to δ is greater than a threshold value θ. If it is determined that the value corresponding to δ is greater than the threshold value θ, operation 1170 may be performed. If it is determined that the value corresponding to δ is not greater than the threshold value θ, operation 1180 may be performed.

In operation 1170, the neural network device may increase a value corresponding to k by 1.

In operation 1180, the neural network device may perform quantizing the parameter into a value in which the quantization values $q_l$ to $q_k$ are grouped.

Figure 12:
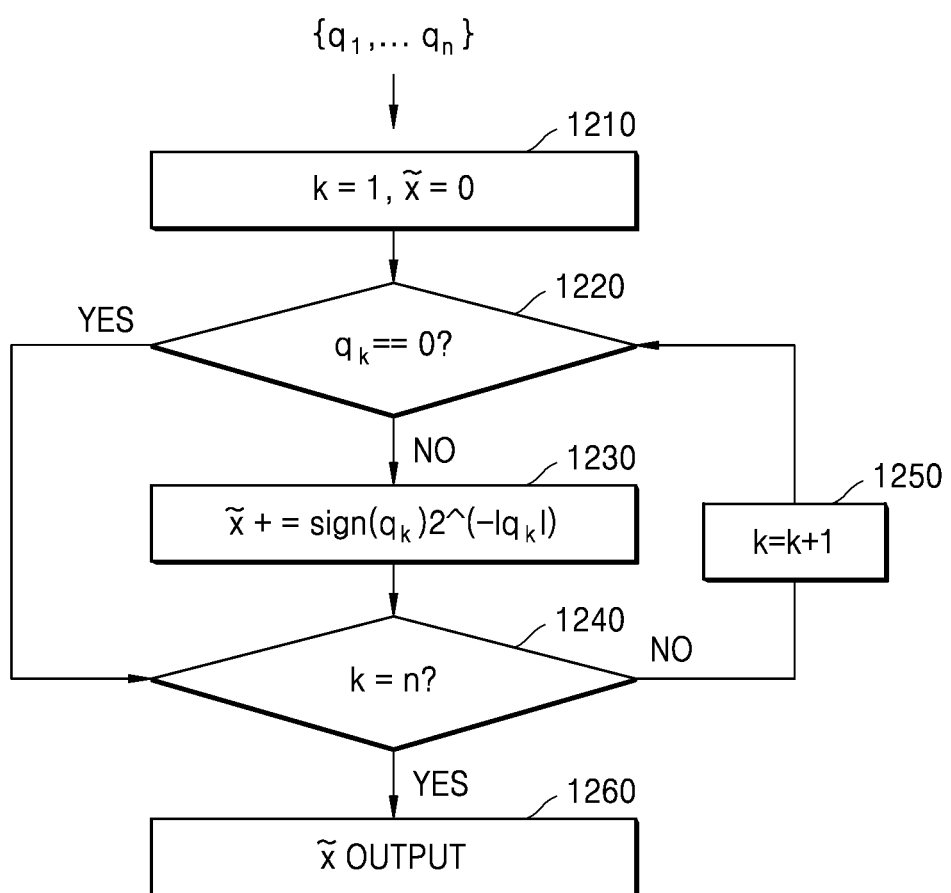
FIG. 12 is a flowchart illustrating a method in which a neural network device dequantizes a parameter, according to one or more embodiments.

FIG. 12 is a flowchart illustrating a method in which a neural network device dequantizes a parameter, according to one or more embodiments.

In operation 1210, the neural network device, such as neural network device 1700 as a non-limiting example, may set k=1 and x̃=0 as being initial conditions. In such an example, a value to be dequantized may be a value in which quantization values $q_1$ to $q_n$ are grouped. In such an example, x̃ may correspond to a value obtained by performing dequantization of the value in which the quantization values $q_1$ to $q_n$ are grouped.

In operation 1220, the neural network device may determine whether a value corresponding to $q_k$ is 0. If it is determined that the value corresponding to $q_k$ is not 0, operation 1230 may be performed. If it is determined that the value corresponding to $q_k$ is 0, operation 1240 may be performed.

In operation 1230, the neural network device may determine a dequantization value x̃ by performing dequantization. x̃ may be determined using the example Equation 5, below.

$$\tilde{x} = \text{sign}(q_k)2^{|q_x|} \quad \text{Equation 5:}$$

In Equation 5, sign(δ) may be determined to be 1 or −1 according to the sign of δ. In such an example, the value x̃ obtained by dequantization of the value in which the quantization values $q_1$ to $q_n$ are grouped may be determined by accumulating values obtained by dequantization of the quantization values $q_1$ to $q_n$.

In operation 1240, the neural network device may determine whether a value corresponding to k is n. If it is determined that the value corresponding to k is n, operation 1260 may be performed. If it is determined that the value corresponding to k is not n, operation 1250 may be performed.

In operation 1250, the neural network device may increase the value corresponding to k by 1.

In operation 1260, the neural network device may output x̃ as a value obtained by dequantization of the value in which the quantization values $q_1$ to $q_n$ are grouped. x̃ may be obtained by accumulating values obtained by dequantization of the quantization values $q_1$ to $q_n$.

FIG. 13 is a view for comparing accuracies according to methods of quantizing a parameter in a neural network, according to one or more embodiments.

Example models of neural networks used for calculating the accuracy of image classification may include AlexNet, SqueezeNet, and VGG-S, as non-limiting embodiments. FIG. 13 presents the classification accuracy (%) in a neural network when each of the linear quantization method (LinQ), the log quantization method (Log Q), and the log quantization method (SLQ) according to embodiments are applied to the neural network, such as neural network device 1700 as a non-limiting example. As described above, in the log quantization method (SLQ) according to embodiments, a parameter may be represented by two or more quantization values when a quantization error value is greater than or equal to a threshold value. For example, float 32b represents an example in which the parameter is not quantized.

According to FIG. 13, when the log quantization method (SLQ) according to embodiments is applied, the accuracy may be improved by about 2% to about 4% as compared to the existing log quantization methods, that is, the linear quantization method (LinQ) and the log quantization method (Log Q).

Figure 14:
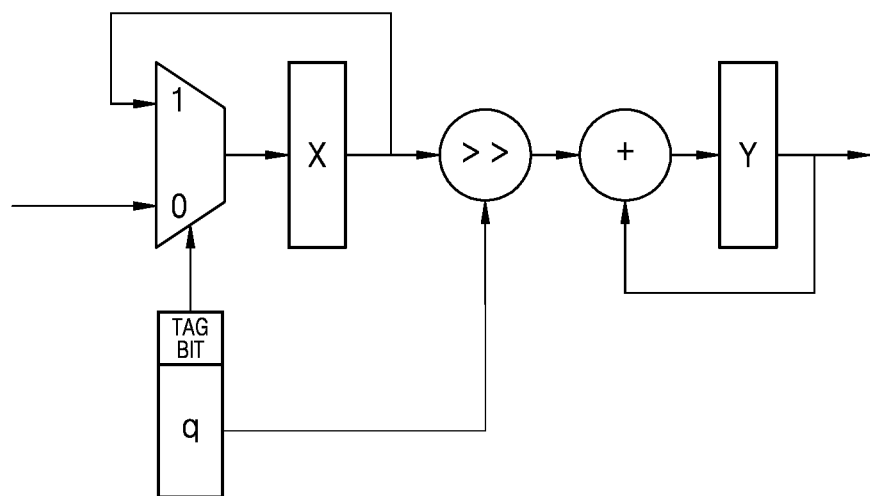
FIG. 14 is a block diagram illustrating a computing apparatus that performs a multiplication and accumulation (MAC) operation, according to one or more embodiments.

FIG. 14 is a block diagram illustrating a computing apparatus that performs a multiplication and accumulation (MAC) operation, according to one or more embodiments.

For example, the neural network device, such as neural network device 1700 as a non-limiting example, may quantize weight values processed in a layer of a neural network and may store quantized weight values in a memory. Subsequently, the neural network device may dequantize the quantized weight values and may perform a convolution operation between the dequantized weight values and input activation values.

In such an example, when a weight value is quantized to a value, also referred to as a grouped value, in which a first quantization value and a second quantization value are grouped, the neural network device may dequantize the grouped value and may perform a convolution operation between a value obtained by dequantization of the grouped value and an input activation value. The neural network device may also calculate each of a first dequantization value, which may be a value obtained by dequantization of the first quantization value, and a second dequantization value, which may be a value obtained by dequantization of the second quantization value. The neural network device may further dequantize the grouped value by adding the first dequantization value and the second dequantization value.

Accordingly, the first dequantization value, which is a value obtained by dequantization of the first quantization value, and the second dequantization value, which is a value obtained by dequantization of the second quantization value, may be arithmetically operated upon using the same input activation value.

FIG. 14 illustrates a computing apparatus that performs an MAC operation when weight values are quantized using a tag bit. In such an example, q may denote a value obtained by quantization of the weight values, and X may denote an input activation value. When the tag bit is 1, the computing device performing the MAC operation may use the tag bit of 1 as a multiplexer (MUX) selection signal, such that an input activation value X in the previous cycle may be continuously used for computing operations. In such an example, when the tag bit added to a quantization value is 1, this value of the tag bit may indicate that there is another quantization value consecutively located after the quantization value. When the tag bit is 0, because there is no quantization value consecutively located after the quantization value, a new input activation value X different from the input activation value X in the previous cycle may be input and an operation may be performed accordingly.

Figure 15:
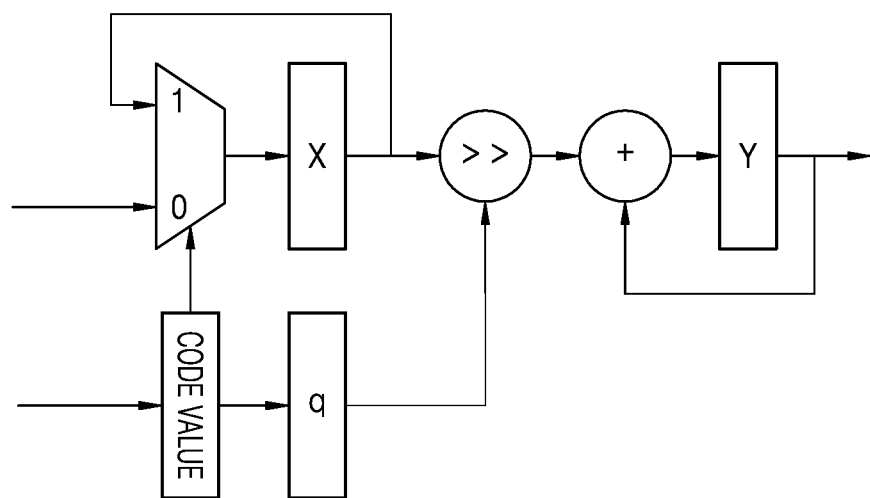
FIG. 15 is a block diagram illustrating a computing apparatus that performs an MAC operation, according to one or more embodiments.

FIG. 15 is a block diagram illustrating a computing apparatus that performs an MAC operation, according to one or more embodiments.

FIG. 15 illustrates a computing apparatus that performs an MAC operation when weight values are quantized using a code value. In FIG. 15, q denotes a value where the weight values are quantized and X denotes an input activation value. When the code value is received, the computing device performing the MAC operation may use the code value as a MUX selection signal. Accordingly, the same input activation value X may be continuously used for computing operations with respect to a first quantization value and a second quantization value that are consecutively input after the code value. An operation result between the code value and the input activation value X may not be accumulated in a result value Y.

FIG. 16 is a block diagram of an electronic system 1600 according to one or more embodiments.

Referring to FIG. 16, the electronic system 1600 may extract information by analyzing input data in real time based on a neural network. The electronic system 1600 may also determine a situation based on the extracted information or control configurations of an electronic device, on which the electronic system 1600 is mounted. The electronic device may also be the electronic system 1600. For example, the electronic system 1600 may be, or applied to, a robot device such as a drone, an advanced driver assistance system (ADAS), and similar systems, as well as a smart TV, a smart phone, a medical device, a mobile device, an image display device, a measurement device, an Internet of Things (IoT) device, and so on, and may be, or mounted on or otherwise coupled to at least one of these various kinds of electronic devices.

The electronic system 1600 may include a central processing unit (CPU) 1610, a random access memory (RAM) 1620, a neural network device 1630, a memory 1640, a sensor module 1650, and a communication module 1660, according to a non-limiting example. The electronic system 1600 may further include other elements in addition to or in lieu of these enumerated examples, such as an input/output module 1670, a security module 1680, a power control device 1690, and so on, in various examples. For example, some of the hardware configurations of the electronic system 1600 may be mounted on at least one semiconductor chip. The neural network device 1630 may be a device including the processing apparatuses described above with reference to the one or more embodiments of FIGS. 3-15 and may be a hardware accelerator dedicated to executing the neural network or a device including such a hardware accelerator, where the hardware accelerator may include hardware dedicated to executing a neural network or operations for supporting a neural network more efficiently. The processing apparatuses of FIGS. 3-15 may also be the electronic system 1600.

The CPU 1610 controls the overall operation of the electronic system 1600. The CPU 1610 may include one processor core, or a single core processor, or a plurality of processor cores, or a multi-processor. The CPU 1610 may process or execute instructions and/or data stored in the memory 1640. In one or more embodiments, the CPU 1610 may control the function of the neural network device 1630 by executing the instructions stored in the memory 1640. The CPU 1610 may be implemented as a CPU, a graphics processing unit (GPU), an application processor (AP), or the like. Through the execution of instructions, the processor 1610 may be configured to perform one or more or all operations and methods described herein.

The RAM 1620 may temporarily store instructions, data, or applications of the electronic system 1600. For example, the instructions and/or data stored in the memory 1640 may be temporarily stored in the RAM 1620 under the control of or based on booting code of the CPU 1610. For example, the RAM 1620 may be implemented as a memory such as dynamic random access memory (DRAM) or static random access memory (SRAM), as non-limiting examples.

The neural network device 1630 may perform an operation of the neural network based on received input data and may generate an information signal based on the result of the operation. The neural network may include, but is not limited to, a convolutional neural network (CNN), a recurrent neural network (RNN), a deep belief network, a restricted Boltzmann machine, as non-limiting examples. The neural network device 1630 may include hardware that performs processing by implementing the neural network quantized to the fixed point type described above, and may correspond to a hardware accelerator dedicated to the neural network and/or other hardware (or hardware plus instructions as an implementation) including the processing apparatuses described with reference to FIGS. 3-15, for example.

The information signal may include one of various types of recognition signals such as a speech recognition signal, an object recognition signal, an image recognition signal, and a biometric information recognition signal, as non-limiting examples. For example, the neural network device 1630 may receive frame data included in a video stream as input data, and may generate a recognition signal with respect to an object included in an image represented by the frame data from the frame data. However, the neural network device 1630 is not limited to these specific enumerated examples, and the neural network device 1630 may receive various types of input data according to the type or function or application of the electronic device on which the electronic system 1600 is, or is mounted or to which the electronic system 1600 is coupled, and may generate a recognition signal according to the input data.

The memory 1640 may be a storage location for storing data, and may store an operating system (OS), various programs or applications, and various kinds of data. In one or more embodiments, the memory 1640 may store intermediate results generated during the operation of the neural network device 1630, for example, an output feature map, in the form of an output feature list or an output feature matrix. In one or more embodiments, a compressed output feature map may be stored in the memory 1640. In addition, the memory 1640 may store quantized neural network data used in the neural network device 1630, for example, parameters, a weight map, or a weight list. The memory 1640 may also store the neural network as non-quantized and/or quantized parameters.

The memory 1640 may be a DRAM, but is not limited thereto. The memory 1640 may include at least one of volatile memory and nonvolatile memory. For example, the nonvolatile memory may include read only memory (ROM), programmable ROM (PROM), erasable programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), or the like, as non-limiting examples. The volatile memory may include DRAM, SRAM, synchronous DRAM (SDRAM), PRAM, MRAM, RRAM, FRAM, and the like, as non-limiting examples. In an embodiment, the memory 1640 may include at least one of a hard disk drive (HDD), a solid state drive (SSD), a compact flash (CF), a secure digital (SD), a micro-SD, a mini-SD, an extreme digital (xD), or a memory stick, which provide durable storage capabilities.

In an example, the sensor module 1650 may collect information around the electronic device on which the electronic system 1600 is mounted, or around the electronic system, wherein the electronic system is the electronic device. For example, the sensor module 1650 may sense or receive a signal, for example, an image signal, a speech signal, a magnetic signal, a biometric signal, a touch signal, and so on, from the outside of the electronic device and may convert the sensed or received signal into data. To this end, the sensor module 1650 may be respective of or include at least one of various types of sensing devices. For example, sensing devices may include a microphone, an imaging device, an image sensor, a light detection and ranging (LIDAR) sensor, an ultrasonic sensor, an infrared sensor, a biometric sensor, and a touch sensor, as non-limiting examples.

The sensor module 1650 may provide the converted data to the neural network device 1630 as input data. For example, the sensor module 1650 may include an image sensor, may generate a video stream by capturing an external environment of the electronic device, and may sequentially provide consecutive data frames of the video stream to the neural network device 1630 as the input data, as a non-limiting example. However, the present disclosure is not limited to this particular example, and the sensor module 1650 may provide various additional and/or other types of data to the neural network device 1630, in other examples.

The communication module 1660 may include various wired or wireless interfaces for communicating with an external device. For example, the communication module 1660 may include a communication interface capable of accessing a wired local area network (LAN), a wireless local area network (WLAN) such as wireless fidelity (Wi-Fi), a wireless personal area network (WPAN) such as Bluetooth, a wireless universal serial bus (USB), a zigbee, a near field communication (NFC), a radio-frequency identification (RFID), a power line communication (PLC), or a mobile cellular network such as 3rd generation (3G), 4th generation (4G), long term evolution (LTE), 5th Generation (5G), and so on.

Hereinafter, a neural network device, e.g., the neural network device 1630 of FIG. 16 will be described with reference to FIG. 17.

FIG. 17 is a block diagram illustrating a configuration of a neural network device 1700, according to one or more embodiments.

The neural network device 1700 may be implemented using various types of devices, such as a personal computer (PC), a server device, a mobile device, and an embedded device, as non-limiting examples. For example, the neural network device 1700 may be implemented as, or as a part of, a smart phone, a tablet device, an augmented reality (AR) device, an IoT device, an autonomous vehicle, robotics, a medical device, and so on, which may perform speech recognition, image recognition, and image classification using a neural network, but examples are not limited to these enumerated examples. Furthermore, the neural network device 1700 may correspond to a dedicated hardware accelerator mounted on the above device. In addition, the neural network device 1700 may be a hardware accelerator, such as a neural processing unit (NPU), which is a dedicated module for driving a neural network, a tensor processing unit (TPU), or a neural engine, but is not limited thereto.

Referring to FIG. 17, the neural network device 1700 may include at least one processor 1710 and at least one memory 1720. In the neural network device 1700 illustrated in FIG. 17, only some components of one or more embodiments are shown, while in other embodiments, the neural network device 1700 may further include other components in addition to or in lieu of the non-limiting components of FIG. 17.

The processor 1710 may quantize a parameter including at least one of input activation values and weight values processed in a layer of the neural network.

First, the processor 1710 may determine a first quantization value by performing log quantization on a parameter.

In addition, the processor 1710 may compare a threshold value with an error between a first dequantization value obtained by dequantization of the first quantization value and the parameter. In such an example, the threshold value may be determined based on a determined trade-off relationship between the recognition rate of the neural network and the size of data according to the quantization of the parameter.

When the error is greater than the threshold value as the result of the comparing, the processor 1710 may determine a second quantization value by performing log quantization on the error. However, when the error is less than the threshold value, the parameter may be quantized to the first quantization value.

Finally, the processor 1710 may quantize the parameter into a value in which the first and second quantization values are grouped. In addition, the processor 1710 may add a tag bit to each of the first quantization value and the second quantization value to indicate that the first and second quantization values are values obtained by quantizing one parameter. For example, the processor 1710 may add a first tag bit, which indicates that there is a second quantization value subsequent to a first quantization value, before a first bit of bits representing the first quantization value or after a last bit of the bits, and may add a second tag bit, which indicates that there is no quantization value subsequent to the second quantization value, before a first bit of bits representing the second quantization value or after a last bit of the bits. As an alternative approach, the processor 1710 may add a code value, which indicates that the first quantization value and the second quantization value are consecutive values, before a first bit of bits representing the first quantization value or after a last bit of bits representing the second quantization value.

When the weight values processed in the layer of the neural network are quantized, the processor 1710 may dequantize a value, also referred to as a grouped value, in which a first quantization value and a second quantization value are grouped. The processor 1710 may then perform a convolution operation between a dequantization value obtained by dequantization of the grouped value and input activation values. For example, the processor 1710 may calculate each of a first dequantization value, where the first dequantization value is a value obtained by dequantization of the first quantization value, and a second dequantization value, where the second dequantization value is a value obtained by dequantization of the second quantization value. The processor 1710 may obtain the dequantization value, accordingly, by adding the first dequantization value and the second dequantization value.

The processor 1710 may be implemented as a central processing unit (CPU), a graphics processing unit (GPU), an application processor (AP), a neural processing unit (NPU), a tensor processing unit (TPU), or the like, provided in the neural network device 1700, but is not limited to these enumerated embodiments, and the processor 1710 may be implemented with other types of processors in other embodiments. Also, the processor is not limited to being a single processor, but may also be implemented using multiple processors, or a multicore processor.

The memory 1720 may be hardware that stores various kinds of neural network data and/or parameters to be processed in the neural network device 1700 and data to be processed by the processor 1710. For example, the memory 1720 may store a parameter including at least one of input activation values and weight values processed in a layer, a first quantization value, a second quantization value, and so. The memory 1720 may include RAM such as DRAM or SRAM, ROM, EEPROM, CD-ROM, Blu-ray or other optical disk storage, HDD, SSD, or flash memory, as non-limiting examples, but is not limited to these enumerated examples.

The electronic systems, electronic system 1600, CPUs, CPU 1610, RAMs, RAM 1620, neural network devices, neural network device 1630, memories, memory 1640, sensor modules, sensor module 1650, communication modules, communication module 1660, input/output modules, input/output module 1670, security modules, security module 1680, power control modules, power control module 1690, neural network devices, neural network device 1700, processors, processor 1710, memories, and memory 1720 in FIGS. 1-17 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   determining a first quantization value by performing log quantization on a parameter from one of input activation values and weight values in a layer of a neural network;
   comparing a threshold value with an error between a first dequantization value obtained by dequantization of the first quantization value and the parameter;
   determining a second quantization value by performing log quantization on the error in response to the error being greater than the threshold value as a result of the comparing; and
   quantizing the parameter to a value in which the first quantization value and the second quantization value are grouped.

2. The method of claim 1,
   wherein the determining of the first quantization value comprises:
   determining the first quantization value by performing log quantization on a value corresponding to a quantization level closest to the parameter, from among a plurality of quantization levels, and
   the determining of the second quantization value comprises:
   determining the second quantization value by performing log quantization on a value corresponding to a quantization level closest to the error, from among the plurality of quantization levels.

3. The method of claim 1, wherein the second quantization value is represented by a same number of bits as a number of bits representing the first quantization value.

4. The method of claim 1, wherein the threshold value is determined based on a predetermined trade-off relationship between a recognition rate of the neural network and a size of data according to the quantization of the parameter.

5. The method of claim 1, wherein the quantizing comprises:
   adding a tag bit to each of the first quantization value and the second quantization value.

6. The method of claim 5, wherein the adding comprises:
   adding a first tag bit, indicating that there is the second quantization value subsequent to the first quantization value, before a first bit of bits representing the first quantization value or after a last bit of the bits, and
   adding a second tag bit, indicating that there is no quantization value subsequent to the second quantization value, before a first bit of bits representing the second quantization value or after a last bit of the bits.

7. The method of claim 1, wherein the quantizing comprises:
   adding a code value, indicating that the first quantization value and the second quantization value are consecutive values, before a first bit of bits representing the first quantization value or after a last bit of bits representing the second quantization value.

8. The method of claim 1, further comprising:
   dequantizing the value in which the first quantization value and the second quantization value are grouped; and
   performing a convolution operation between a dequantization value obtained by dequantizing the value and the input activation values.

9. The method of claim 8, wherein the dequantizing of the value comprises:
   calculating each of a first dequantization value, which is a value obtained by dequantization of the first quantization value, and a second dequantization value, which is a value obtained by dequantization of the second quantization value; and
   obtaining the dequantization value by adding the first dequantization value and the second dequantization value.

10. A non-transitory computer-readable storage medium storing instructions that, when executed by a processor, cause the processor to perform the method of claim 1.

11. An apparatus, the apparatus comprising:
    one or more processors configured to:
    determine a first quantization value by performing log quantization on a parameter from one of input activation values and weight values in a layer of a neural network;
    compare a threshold value with an error between a first dequantization value obtained by dequantization of the first quantization value and the parameter;
    determine a second quantization value by performing log quantization on the error in response to the error being greater than the threshold value as a result of the comparing; and
    quantize the parameter to a value in which the first quantization value and the second quantization value are grouped.

12. The apparatus of claim 11, wherein the one or more processors are further configured to:
    determine the first quantization value by performing log quantization on a value corresponding to a quantization level closest to the parameter, from among a plurality of quantization levels; and
    determine the second quantization value by performing log quantization on a value corresponding to a quantization level closest to the error, from among the plurality of quantization levels.

13. The apparatus of claim 11, wherein the second quantization value is represented by a same number of bits as a number of bits representing the first quantization value.

14. The apparatus of claim 11, wherein the threshold value is determined based on a predetermined trade-off relationship between a recognition rate of the neural network and a size of data according to the quantization of the parameter.

15. The apparatus of claim 11, wherein the one or more processors are further configured to add a tag bit to each of the first quantization value and the second quantization value.

16. The apparatus of claim 15, wherein the one or more processors are further configured to:
add a first tag bit, indicating that there is the second quantization value subsequent to the first quantization value, before a first bit of bits representing the first quantization value or after a last bit of the bits; and
add a second tag bit, indicating that there is no quantization value subsequent to the second quantization value, before a first bit of bits representing the second quantization value or after a last bit of the bits.

17. The apparatus of claim 11, wherein the one or more processors are further configured to add a code value, indicating that the first quantization value and the second quantization value are consecutive values, before a first bit of bits representing the first quantization value or after a last bit of bits representing the second quantization value.

18. The apparatus of claim 11, wherein the one or more processors are further configured to:
dequantize the value in which the first quantization value and the second quantization value are grouped; and
perform a convolution operation between a dequantization value obtained by dequantizing the value and the input activation values.

19. The apparatus of claim 18, wherein the one or more processors are further configured to:
calculate each of a first dequantization value, which is a value obtained by dequantization of the first quantization value, and a second dequantization value, which is a value obtained by dequantization of the second quantization value; and
obtain the dequantization value by adding the first dequantization value and the second dequantization value.

* * * * *